G. W. Creamer,
Smiths' Tongs.
Nº 40,913.
Patented Dec. 15, 1863.
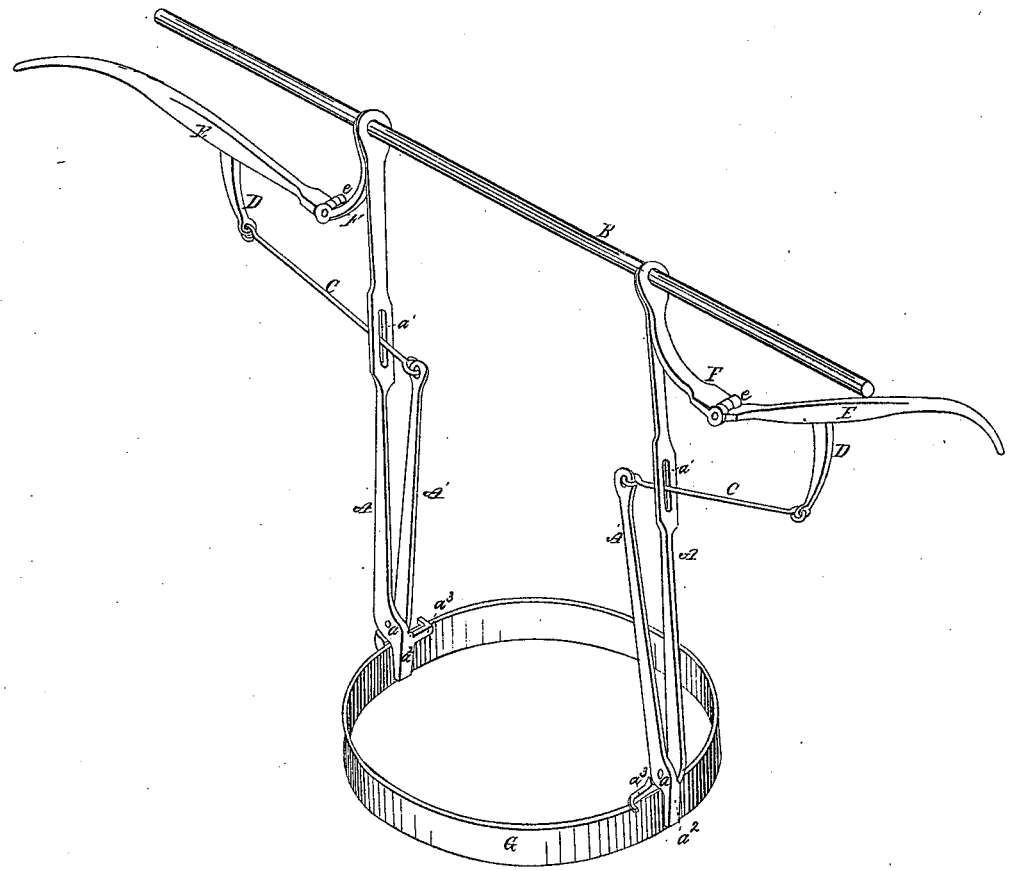

UNITED STATES PATENT OFFICE.

GEORGE W. CREAMER, OF FILLMORE, PENNSYLVANIA.

IMPROVEMENT IN APPARATUS FOR LIFTING AND REMOVING WHEEL-TIRES.

Specification forming part of Letters Patent No. 40,913, dated December 15, 1863.

*To all whom it may concern:*

Be it known that I, GEORGE W. CREAMER, of Fillmore, in the county of Centre and State of Pennsylvania, have invented a certain new and Improved Apparatus for Lifting and Carrying Wheel-Tires; and I do hereby declare the following to be a full and exact description of the same, reference being had to the accompanying drawing, making part of this specification, in which my invention is represented by a perspective view.

The object of this invention is to provide an implement by which heated tires may be lifted and conveyed from place to place with greater facility, the danger of contact with the hot iron prevented, and the respective operations of removing said tires from the wood fires in which they are generally heated and setting them upon wheels rendered more agreeable to the workmen, for the reason to be hereinafter explained.

The invention consists in the combination of two pairs of tongs of peculiar construction, employed in connection with a horizontal rod passing through their upper ends in such manner that when the apparatus is sustained by means of handles, to be hereinafter described, the tire will be tightly grasped and held by the jaws of the tongs, but when held by the horizontal bar the tire will be released, as will be described.

In order that others skilled in the art to which my invention appertains may be enabled to fully understand and use the same, I will proceed to describe its construction and operation.

In the accompanying drawings are illustrated two pairs of tongs, each pair being constructed with a long and short shank or arm, A A', respectively, which are pivoted together at $a$. These tongs are coupled so as to work in connection with one another by a rod, B, which may be passed through holes in the upper ends of the long shanks A A. The short shanks A' terminate at a point where the shanks $a$ are each provided with a slot, $a'$, and the said short shanks are here jointed or pivoted, respectively, to rods C C, which in like manner are attached to short rigid arms D D, formed upon the handles E E. Each handle E is hinged at $e$ to a bar or ear, F, which is secured to the upper end of the shank A.

The drawings illustrate the position of the parts while a tire, G, is in suspension. Each respective jaw $a^2$ of the shanks A is formed with a check, $a^3$, adapted to retain the tire in a horizontal position while in suspension.

The operation of the apparatus will be understood from the preceding description.

To apply the apparatus to the tire, two operators grasp the rigid rod B, each by one hand to each end, taking the handles E E by their other hands, but without raising the said handles. The jaws $a^2$ $a^2$, thus remaining open, are passed over the tire, to grasp which the operators raise the handles E E, and then leave go of the rod. While the device is thus suspended by means of the handles E E the jaws $a^2$ $a^2$ will be caused to tightly clasp and retain in an immovable position the tire over which they may be placed, the bars F constituting fulcra for the handles E E, the elevation of which applies the requisite force to the shanks A', through the medium of the rods C C. It will be seen that while the tire is thus suspended the workmen are enabled to carry it from place to place without experiencing the tiresome strain upon their arms which has hitherto attended this kind of work, in consequence of the strength necessary to be expended in preventing contact of the heated iron with the limbs or garments; and it is also apparent that when the heated tire is to be removed from the fire the workmen are not subject to the disagreeable task of standing directly over the same and in the midst of the smoke which rises in offensive columns from the wood fires generally made use of. When the tire is to be released from the jaws of the tongs, it is only necessary to drop the handles E E, when the apparatus may be removed independently of the tire by the rod B.

This implement is simple, may be constructed at little expense, and is a long-needed acquisition to the art in which it is designed to be employed.

Having thus described my invention, the following is what I claim as new therein and desire to secure by Letters Patent:

1. The tongs A A' $a^2$, checks $a^3$, rod C, arm

D, handle E, and bar or ear F, employed in the manner described, to elevate and convey wheel-tire.

2. In combination with two pairs of tongs, the rigid rod B, operating as described, to adapt the tongs to act in conjunction and and either grasp or release the tire.

The above specification of my improved apparatus for lifting and carrying wheel-tires signed this 10th day of September, 1863.

GEORGE W. CREAMER.

Witnesses:
OCTAVIUS KNIGHT,
CHARLES D. SMITH.